(12) United States Patent
Rudisill et al.

(10) Patent No.: US 11,850,795 B2
(45) Date of Patent: Dec. 26, 2023

(54) THREE-DIMENSIONAL PRINTING WITH TRIETHYLENE GLYCOL FUSING AGENTS

(71) Applicant: Hewlett-Packard Development Company, L.P., Spring, TX (US)

(72) Inventors: Stephen G. Rudisill, San Diego, CA (US); Carolin Fleischmann, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 91 days.

(21) Appl. No.: 17/294,101

(22) PCT Filed: Jun. 10, 2019

(86) PCT No.: PCT/US2019/036400
§ 371 (c)(1),
(2) Date: May 14, 2021

(87) PCT Pub. No.: WO2020/251541
PCT Pub. Date: Dec. 17, 2020

(65) Prior Publication Data
US 2022/0088857 A1 Mar. 24, 2022

(51) Int. Cl.
*B29C 64/165* (2017.01)
*B29C 64/264* (2017.01)
*B29C 64/295* (2017.01)
*B29C 64/30* (2017.01)
*B29C 64/188* (2017.01)
(Continued)

(52) U.S. Cl.
CPC .......... *B29C 64/165* (2017.08); *B29C 64/188* (2017.08); *B29C 64/264* (2017.08); *B29C 64/295* (2017.08); *B29C 64/30* (2017.08); *B29K 2995/0012* (2013.01); *B33Y 10/00* (2014.12); *B33Y 30/00* (2014.12); *B33Y 40/20* (2020.01); *B33Y 70/10* (2020.01)

(58) Field of Classification Search
CPC .................................................... B29C 64/165
See application file for complete search history.

(56) References Cited

U.S. PATENT DOCUMENTS 6,110,266 A 8/2000 Gonzalez-Blanco et al.
7,767,132 B2 * 8/2010 Patel .................... B29C 64/165
264/460

(Continued)

FOREIGN PATENT DOCUMENTS

CN 1803945 A 7/2006
WO WO-2016092309 A1 6/2016
(Continued)

*Primary Examiner* — Atul P. Khare
(74) *Attorney, Agent, or Firm* — HP Inc. Patent Department

(57) ABSTRACT

This disclosure describes three-dimensional printing kits, methods, and systems for three-dimensional printing with triethylene glycol fusing agents. In one example, a three-dimensional printing kit can include a powder bed material including polymer particles and a fusing agent to selectively apply to the powder bed material. The fusing agent can include water, a radiation absorber, and triethylene glycol in an amount from about 20 wt % to about 35 wt %. The radiation absorber can absorb radiation energy and convert the radiation energy to heat to fuse the powder bed material.

10 Claims, 5 Drawing Sheets

(51) Int. Cl.
  *B33Y 70/10*      (2020.01)
  *B33Y 10/00*      (2015.01)
  *B33Y 30/00*      (2015.01)
  *B33Y 40/20*      (2020.01)

(56) References Cited

U.S. PATENT DOCUMENTS

| | | | |
|---|---|---|---|
| 9,873,761 | B1 | 1/2018 | Das et al. |
| 10,240,066 | B2 | 3/2019 | Rolland et al. |
| 10,994,479 | B2* | 5/2021 | Jansen et al. ............ C08K 5/14 |
| 11,104,065 | B2* | 8/2021 | Prasad ................ C09D 11/324 |
| 11,584,827 | B2* | 2/2023 | Parkar ................ A61C 13/0019 |
| 2008/0182191 | A1 | 7/2008 | Moffat et al. |
| 2017/0174920 | A1 | 6/2017 | Cai et al. |
| 2020/0108552 | A1* | 4/2020 | Bartels ................ B29C 64/209 |
| 2022/0088858 | A1* | 3/2022 | Woodruff ............. B29C 64/165 |

FOREIGN PATENT DOCUMENTS

| | | |
|---|---|---|
| WO | 2017/188966 A1 | 11/2017 |
| WO | WO-2019108201 A1 | 6/2019 |

* cited by examiner

THREE-DIMENSIONAL PRINTING WITH TRIETHYLENE GLYCOL FUSING AGENTS

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

Figure 1:
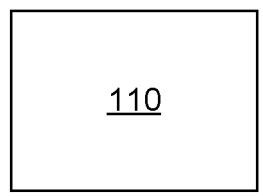
FIG. 1 is a schematic view of an example three-dimensional printing kit in accordance with examples of the present disclosure.
Figure 1:
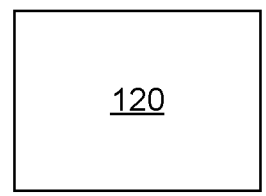

The figures depict several examples of the presently disclosed technology. However, it should be understood that the present technology is not limited to the examples depicted.

DETAILED DESCRIPTION

The present disclosure describes three-dimensional printing kits, methods, and systems. In one example, a three-dimensional printing kit can include a powder bed material including polymer particles, and a fusing agent to selectively apply to the powder bed material. The fusing agent can include water, a radiation absorber, and triethylene glycol in an amount from about 20 wt % to about 35 wt %. The radiation absorber can absorb radiation energy and convert the radiation energy to heat. In certain examples, the radiation absorber can be a metal dithiolene complex, carbon black, a near-infrared absorbing dye, a near-infrared absorbing pigment, metal nanoparticles, a conjugated polymer, or a combination thereof. In other examples, the polymer particles can include polyamide 6, polyamide 9, polyamide 11, polyamide 12, polyamide 6,6, polyamide 6,12, polyethylene, thermoplastic polyurethane, polypropylene, polyester, polycarbonate, polyether ketone, polyacrylate, polystyrene, wax, or a combination thereof. In a particular example, the radiation absorber can be carbon black and the polymer particles can include polyamide 12. In another example, the three-dimensional printing kit can also include a detailing agent including a detailing compound. The detailing compound can reduce the temperature of powder bed material onto which the detailing agent is applied.

The present disclosure also describes methods of making three-dimensional printed articles. In one example, a method of making a three-dimensional printed article can include iteratively applying individual build material layers of polymer particles to a powder bed. A fusing agent can be selectively jetted onto the individual build material layers based on a three-dimensional object model. The fusing agent can include water, a radiation absorber, and triethylene glycol in an amount from about 20 wt % to about 35 wt %. The radiation absorber can absorb radiation energy and convert the radiation energy to heat. The powder bed can be exposed to radiation energy to selectively fuse the polymer particles in contact with the radiation absorber at individual build material layers and thereby form the three-dimensional printed article. In a further example, the three-dimensional printed article can be post-cured at a post-cure temperature from about 160° C. to about 250° C. In some examples, the post-curing can include holding the three-dimensional article at the post-cure temperature for a post-cure time from about 2 hours to about 30 hours. In other examples, the three-dimensional printed article can have a tensile strength from about 60 MPa to about 100 MPa and a Young's modulus from about 2,000 MPa to about 4,000 MPa. In certain examples, the concentration of triethylene glycol in the build material after jetting the fusing agent onto the individual build material layers can be from about 2.5 wt % to about 4.5 wt % with respect to the weight of the build material. In a particular example, the radiation absorber can be carbon black and the polymer particles can include polyamide 12. In another example, the method can also include selectively jetting a detailing agent including a detailing compound onto the individual build material layers. The detailing compound can reduce the temperature of build material onto which the detailing agent is applied.

The present disclosure also describes systems for three-dimensional printing. In one example, a system for three-dimensional printing can include a powder bed material including polymer particles; a powder applicator to distribute a layer of the powder bed material onto a support bed; and a fluid ejector fluidly coupled to a fusing agent and positioned to eject the fusing agent onto the layer of powder bed material. The fusing agent can include water, a radiation absorber, and triethylene glycol in an amount from about 20 wt % to about 35 wt %. The radiation absorber can absorb radiation energy and convert the radiation energy to heat. The system can also include a radiant energy source positioned to expose the layer of powder bed material to radiation energy to selectively fuse the polymer particles in contact with the radiation absorber and thereby form a three-dimensional printed article. In another example, the system can also include a post-curing heater to post-cure the three-dimensional printed article at a post-cure temperature from about 160° C. to about 250° C. for a post-cure time from about 2 hours to about 30 hours. In yet another example, the system can also include a second fluid ejector fluidly coupled to a detailing agent including a detailing compound and positioned to eject the detailing agent onto the layer of powder bed material. The detailing compound can reduce the temperature of powder bed material onto which the detailing agent is applied.

The three-dimensional printing kits, methods, and systems described herein can be used to make three-dimensional (3D) printed articles with increased strength, stiffness, chemical resistance, and heat resistance. Many 3D printing processes do not offer any avenue for modifying properties of the build material during printing. For example, selective laser sintering (SLS) and fused deposition modelling (FDM) processes usually produce 3D printed articles by melting and re-solidifying a polymer build material in the shape of the desired 3D printed article. No additional reactants are added during the process, and the chemical and physical properties of the polymer remain largely unchanged during the printing process. Certain other processes may allow the addition of reactants or other functional additives during printing. Some 3D printing processes involve applying fluid agents to build material in a powder bed. In such processes, chemical reactants or other additives can be included in the fluid agents and incorporated into the 3D printed article during printing.

The 3D printing processes described herein can involve selectively applying a fusing agent to a powder bed of polymer particles. Generally, the fusing agent can include a radiation absorber that can absorb radiation and convert the radiation to heat. After applying the fusing agent, the powder bed can be exposed to radiation. Portions of the powder bed where the fusing agent was applied can heat up to the point that the polymer powder can become fused together to form a solid layer. In some examples, the fusing agent can include triethylene glycol. The triethylene glycol can react with the polymer powder to crosslink the polymer. In some cases, this crosslinking reaction can occur while the polymer is melted so that when the polymer re-solidifies a strong and hard crosslinked polymer matrix is formed. As an example, in some cases the build material used in this process can be polyamide 12. Typically, 3D printed articles made from polyamide 12 without crosslinked can have a tensile strength of about 50 MPa and a Young's modulus of about 1500 MPa. By using a fusing agent that has from about 20 wt % to about 35 wt % triethylene glycol to crosslink the polyamide 12, a 3D printed article can be made having a tensile strength from about 60 MPa to about 100 MPa and a Young's modulus from about 2,000 MPa to about 4,000 MPa. The 3D printed article can also have increased chemical resistance and heat resistance due to the crosslinking.

Triethylene glycol can also be used in fusing agents for the purpose of increasing jettability of the fusing agent. In some examples, the fusing agent can be jetted using a fluid jet nozzle, such as an inkjet nozzle as used in inkjet printers. Drying of the fusing agent within the nozzle can cause difficulty jetting the fusing agent because the nozzle can potentially become plugged by dried fusing agent. Adding triethylene glycol can slow evaporation of solvent from the fusing agent in the nozzle to reduce this type of nozzle clogging. However, triethylene glycol has been used in relatively small amounts for this purpose. It has also been found that triethylene glycol can negatively affect the appearance of 3D printed articles by causing discoloration of the polymer build material. Therefore, using a high concentration of triethylene glycol in the fusing agent would normally be considered undesirable. However, it has surprisingly been found that using a triethylene glycol concentration from about 20 wt % to about 35 wt % can increase the strength of the 3D printed articles by cross-linking the polymer build material.

Three-Dimensional Printing Kits

With this description in mind, the present disclosure describes three-dimensional printing kits that include materials for 3D printing cross-linked polymer articles. These three-dimensional printing kits can include a build material and a fusing agent that includes triethylene glycol as a crosslinker as described above. FIG. 1 is a schematic of one example three-dimensional printing kit 100. This three-dimensional printing kit includes a powder bed material 110 and a fusing agent 120. The powder bed material can include polymer particles. The fusing agent can be selectively applied to the powder bed material. The fusing agent can include water, a radiation absorber, and triethylene glycol in an amount from about 20 wt % to about 35 wt %. The radiation absorber can absorb radiation energy and convert the radiation energy to heat.

Figure 2:
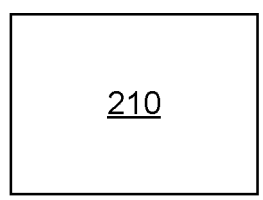
FIG. 2 is a schematic view of another example three-dimensional printing kit in accordance with examples of the present disclosure.
Figure 2:
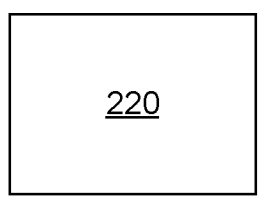
Figure 2:
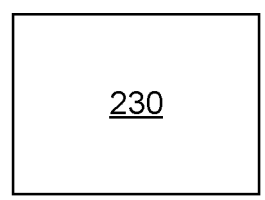

Another example is shown in FIG. 2. This figure shows an example three-dimensional printing kit 200 that includes a powder bed material 210, a fusing agent 220, and a detailing agent 230. The fusing agent and the detailing agent can be selectively applied to the powder bed material. The powder bed material and the fusing agent can include the same ingredients as in the example of FIG. 1. The detailing agent can include a detailing compound that reduces the temperature of powder bed material onto which the detailing agent is applied.

Figure 3A:
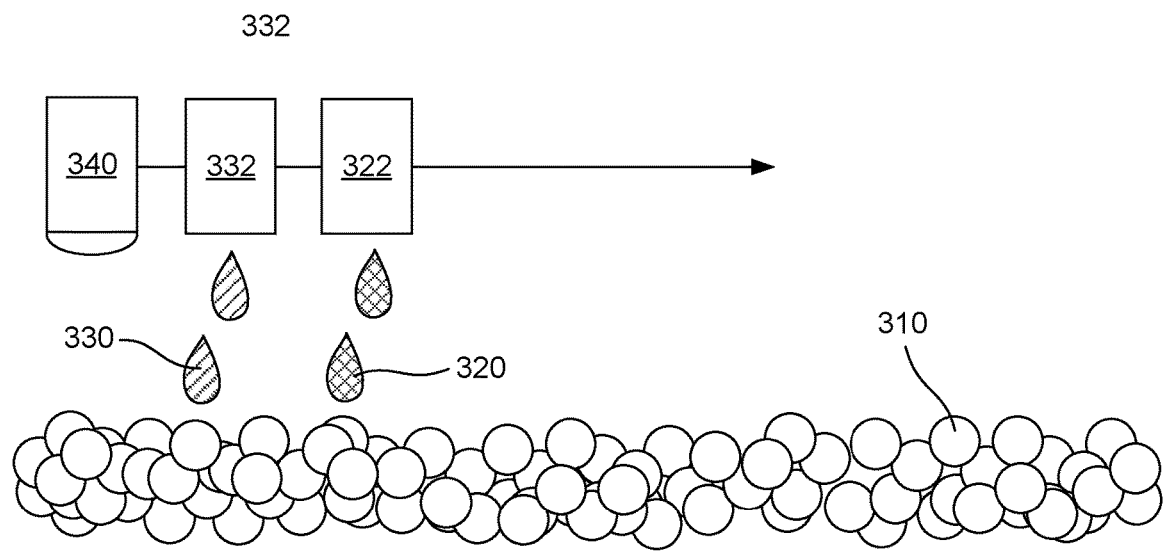
FIGS. 3A-3C show a schematic view of an example three-dimensional printing process using an example three-dimensional printing kit in accordance with examples of the present disclosure.
Figure 3B:
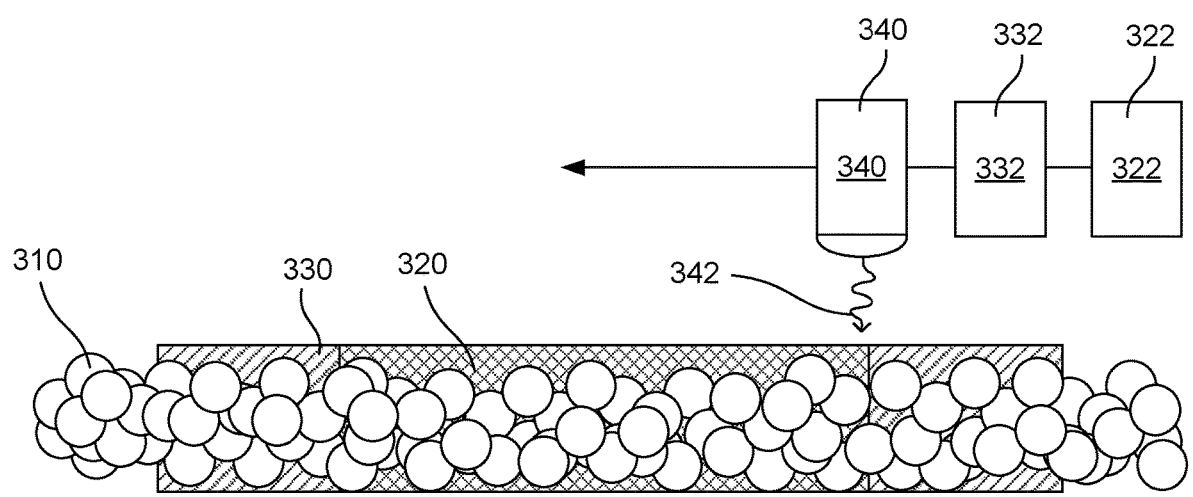
Figure 3C:
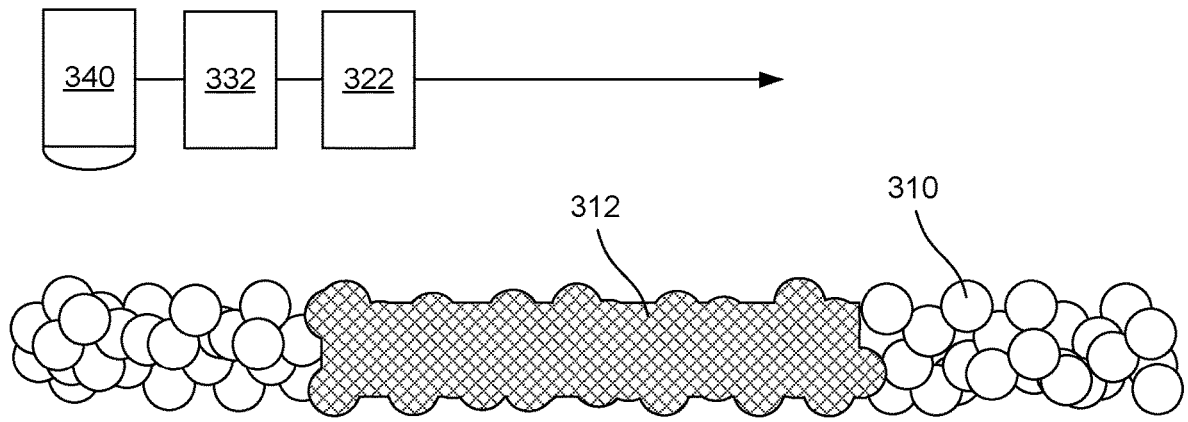

FIGS. 3A-3C illustrate one example of using the three-dimensional printing kits to form a 3D printed article. In FIG. 3A, a fusing agent 320 and a detailing agent 330 are jetted onto a layer of powder bed material 310 made up of polymer particles. The fusing agent is jetted from a fusing agent ejector 322 and the detailing agent is jetted from a detailing agent ejector 332. These fluid ejectors can move across the layer of powder bed material to selectively jet fusing agent on areas that are to be fused, while the detailing agent can be jetted onto areas that are to be cooled. In some cases, the detailing agent can be jetted around edges of the area where the fusing agent was jetted to prevent the surrounding powder bed material from caking. In other examples, the detailing agent can be jetted onto a portion of the same area where the fusing agent was jetted to prevent overheating of the powder bed material. A radiation source 340 can also move across the layer of powder bed material.

FIG. 3B shows the layer of powder bed material 310 after the fusing agent 320 has been jetted onto an area of the layer that is to be fused. Additionally, the detailing agent 330 has been jetted onto areas of the powder bed adjacent to edges of the area where the fusing agent was jetted. In this figure, the radiation source 340 is shown emitting radiation 342 toward the layer of polymer particles. The fusing agent can include a radiation absorber that can absorb this radiation and convert the radiation energy to heat.

FIG. 3C shows the layer of powder bed material 310 with a fused portion 312 where the fusing agent was jetted. This portion has reached a sufficient temperature to fuse the polymer particles together to form a solid polymer matrix. The area where the detailing agent was jetted remains as loose powder. In this example, the detailing agent evaporates to evaporatively cool the polymer particles, which can help produce a well-defined edge of the fused layer by reducing partially fused or caked powder particles around the edges.

Powder Bed Material

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 6,12 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. The fusing agent can also include from about 20 wt % to about 35 wt % triethylene glycol. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles. The triethylene glycol in the fusing agent can act as a crosslinker to crosslink the polymer in the powder bed material.

In some examples, the concentration of triethylene glycol in the fusing agent can be from about 20 wt % to about 35 wt % with respect to the total weight of the fusing agent. In further examples, the concentration can be from about 20 wt % to about 30 wt % or from about 20 wt % to about 25 wt %. Without being bound to a particular mechanism, in some examples the triethylene glycol can crosslink the polymer in the powder bed material through a radical polymerization mechanism.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of $+_2$. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %.

In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Making 3D Printed Articles

Figure 4:
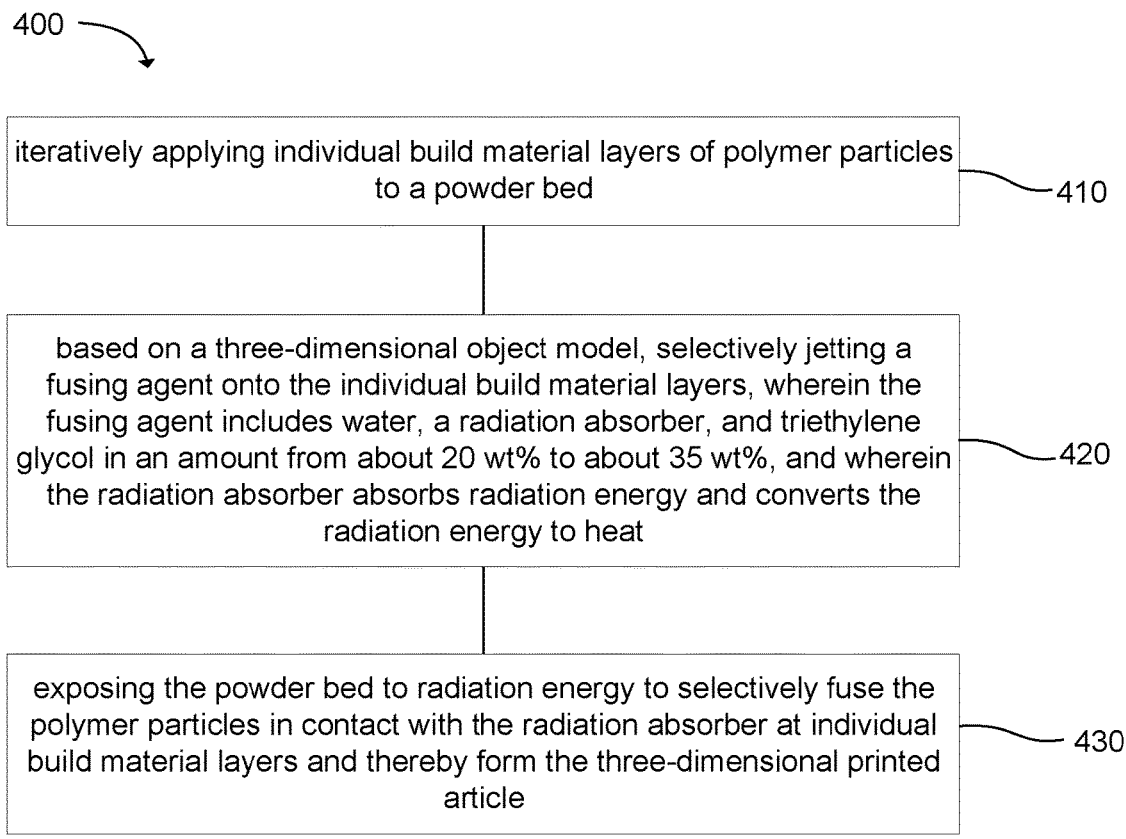
FIG. 4 is a flowchart illustrating an example method of making a three-dimensional printed article in accordance with examples of the present disclosure.

The present disclosure also describes methods of making three-dimensional printed articles. FIG. 4 shows a flowchart illustrating one example method 400 of making a three-dimensional printed article. The method includes: iteratively applying individual build material layers of polymer particles to a powder bed 410; based on a three-dimensional object model, selectively jetting a fusing agent onto the individual build material layers, wherein the fusing agent includes water, a radiation absorber, and triethylene glycol in an amount from about 20 wt % to about 35 wt %, and wherein the radiation absorber absorbs radiation energy and converts the radiation energy to heat 420; and exposing the powder bed to radiation energy to selectively fuse the polymer particles in contact with the radiation absorber at individual build material layers and thereby form the three-dimensional printed article 430. The polymer particles and fusing agent can have any of the ingredients and properties described above.

In some examples, a detailing agent can also be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. In certain examples, the 3D object model can define the three-dimensional shape of the article and the three-dimensional shape of areas of the powder bed to be jetted with detailing agent. In other examples, the article can be defined by a first 3D object model a second 3D object model can define areas to jet the detailing agent. In further examples, the jetting of the detailing agent may not be controlled using a 3D object model, but using some other parameters or instructions to the 3D printing system. Other information may also be included in 3D object models, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

In certain further examples, the method of making a three-dimensional printed article can include post-curing the three-dimensional printed article. This can increase the crosslinking of the polymer with the triethylene glycol. In some examples, the three-dimensional printed article can be post-cured at a post-cure temperature from about 160° C. to about 250° C. In further examples, the post-cure temperature can be from about 170° C. to about 220° C. The three-dimensional printed article can be held at the post-cure temperature (or within the post-cure temperature range) for a post-cure time from about 2 hours to about 30 hours. In further examples, the post cure time can be from about 6 hours to about 24 hours. In certain examples, post-curing the three-dimensional printed article in this way can increase the amount of crosslinking in the polymer, which can increase the strength of the article.

The three-dimensional printed articles produced using the methods described herein can, in some examples, have a higher tensile strength compared to three-dimensional printed articles made using a fusing agent that does not include from about 20 wt % to about 35 wt % triethylene glycol. In some examples, a three-dimensional printed article produced using the methods described herein can have a tensile strength from about 60 MPa to about 100 MPa. In further examples, the three-dimensional printed article can have a tensile strength from about 65 MPa to about 80 MPa. The Young's modulus of the three-dimensional printed article can also be increased. In some examples, the Young's modulus of the three-dimensional printed article can be from about 2,000 MPa to about 4,000 MPa. In other examples, the Young's modulus can be from about 2,500 MPa to about 3,500 MPa. In some particular examples, these properties can be achieved for three-dimensional printed articles made from a polyamide material such as polyamide 12.

The concentration of triethylene glycol in the fusing agent and amount of fusing agent jetted onto the powder bed material can be adjusted to control the total amount of triethylene glycol present in the powder bed material. In some examples, methods of making the three-dimensional printed articles can include jetting a sufficient amount of the fusing agent so that the concentration of triethylene glycol in the powder bed build material is from about 2.5 wt % to about 4.5 wt % with respect to the weight of the build material.

Systems for Three-Dimensional Printing

Figure 5:
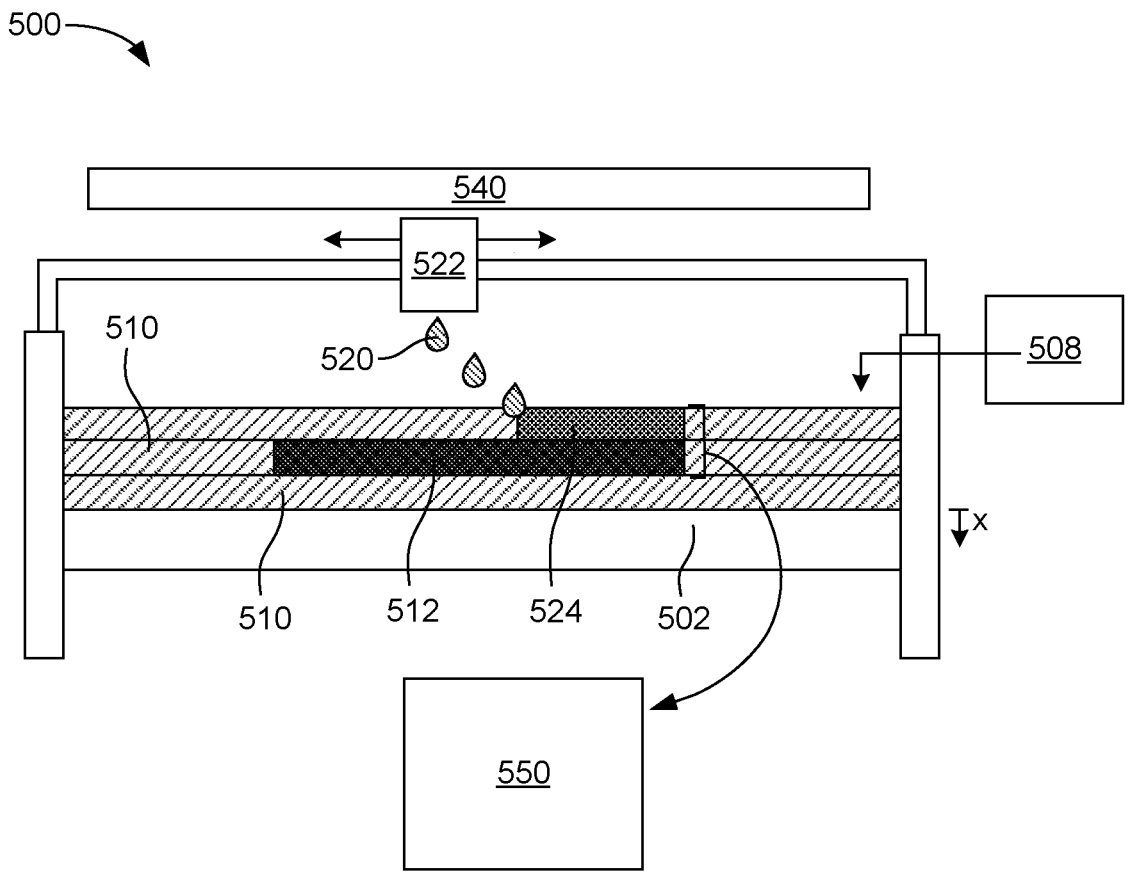
FIG. 5 is a schematic view of an example system for three-dimensional printing in accordance with examples of the present disclosure.

The present disclosure also extends to systems for three-dimensional printing. The systems can generally include the powder bed material and the fusing agent described above. The systems can also include a radiant energy source positioned to expose the powder bed material to radiation to selectively fuse the polymer particles in contact with the radiation absorber from the fusing agent. In some examples, the powder bed material can be distributed in individual layers by a build material applicator, and the fusing agent can be jetted onto the layers by a fluid ejector. FIG. 5 shows an example system 500 for three-dimensional printing in accordance with the present disclosure. The system includes a build platform 502. Powder bed material 510 can be deposited onto the build platform by a build material applicator 508 where the powder bed material can be flattened or smoothed, such as by a mechanical roller or other flattening technique. This can form a flat layer of powder bed material. The fusing agent 520 can then be applied to the layer by a fluid ejector 522. The area 524 where the fusing agent is applied can correspond to a layer or slice of a 3D object model. The system can include a radiant energy source 540 that can apply heat to the layers of powder bed material and fusing agent that has been applied. In this particular example, the system includes a radiant energy source that can irradiate the entire powder bed at once instead of a moveable radiant energy source that moves across the powder bed. The radiant energy source can heat the powder bed material and fusing agent until the powder bed material on which the fusing agent was printed reaches a melting or softening point temperature of the powder bed material. The polymer particles can fuse together to form a solid polymer matrix 512. At the same time, the triethylene glycol in the fusing agent can crosslink the polymer. In this figure, one layer of solid polymer matrix has already been formed and then a layer of additional powder bed material has been spread over the top of the solid layer. The figure shows the fusing agent being applied to the additional layer, which can then subsequently bed heated and fused to add another solid layer to the three-dimensional printed article. This example also includes a post-curing heater 550. After the three-dimensional printed article is complete, the article can be removed from the powder bed and post-cured by the post-curing heater. In one example, the post-curing heater can be an oven.

As used herein, "applying individual build material layers of polymer particles to a powder bed" can include applying the first layer of powder bed material that is applied directly to an empty support bed. The "support bed" can refer to the build platform, as shown in FIG. 5, for example. Additionally, in some examples, a layer or multiple layers of powder bed material can be laid on the support bed without jetting any fusing agent onto the layers. This can provide a more thermally uniform temperature profile for the first layer to have the fusing agent jetted thereon. Accordingly, "applying individual build material layers of polymer particles to a powder bed" can include applying a layer of powder bed material onto the initial layer or layers that may be applied without any fusing agent. The phrase "applying individual build material layers of polymer particles to a powder bed" also includes applying to subsequent layers, when a layer or slice of the three-dimensional printed article has already been formed in the layer below.

In further examples, the system can include a radiant energy source. The radiant energy source can be positioned above the powder bed material as in FIG. 5, or in other examples the heater can be on a side or sides of the powder bed material, or a combination of these locations. In some examples, the support bed can include an additional integrated heater to heat the powder bed material from below to maintain a more uniform temperature in the powder bed. The radiant energy source can be used to heat the areas of the powder bed where fusing agent has been applied to fuse the polymer particles in those areas. In certain examples, the radiant energy source heater can include a heat lamp, infrared heater, halogen lamp, fluorescent lamp, or other type of radiant energy source. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. A detailing agent ejector and any other fluid ejectors in the system can also be mounted on the carriage.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

The effects of triethylene glycol on polyamide 12 powder was investigated by treating the polyamide 12 powder with several agents including triethylene glycol. Two different powder compositions were tested. The various powders were mainly made up of polyamide 12 particles with small amounts of additives. The additives differed between the two powders. The powders were treated with either pure triethylene glycol, a detailing agent formulation that included a small amount of triethylene glycol, a fusing agent that included no triethylene glycol, or a mixture of the fusing agent including no triethylene glycol and the detailing agent including a small amount of triethylene glycol. The powders were blended with the fluids and mixed at 70 g for 60 seconds in an acoustic mixer. The samples to be aged were then aged in an oven at 175° C. for 20 hours. The samples that were not aged were left to sit at room temperature for the same time period. During the time period that the samples were either aged or sitting at room temperature, the liquid in the samples evaporated sufficiently that the samples were not tacky or wet.

The solution viscosity of the treated powders were measured after dissolving the powders in m-cresol. Notably, the powders treated with pure triethylene glycol did not dissolve in the m-cresol even after a period of two weeks. Therefore, the solution viscosity of the powders treated with pure triethylene glycol could not be measured. The results are shown in Table 1.

TABLE 1

| Sample | Powder | Treatment | RSV (unitless) | RSV change (%) |
|---|---|---|---|---|
| 1 | A | none | 1.88 | n/a |
| 2 | A | aged without solvent | 2.007 | 6.8 |
| 3 | A | aged with DA | 2.161 | 15 |
| 4 | A | aged with TEG | — | — |
| 5 | A | aged with FA | 1.996 | 6.2 |
| 6 | A | aged with FA + DA | 1.836 | −2.3 |
| 7 | B | none | 1.883 | n/a |
| 8 | B | aged without solvent | 1.956 | 3.9 |
| 9 | B | aged with DA | 2.350 | 24.8 |
| 10 | B | aged with TEG | — | — |
| 11 | B | aged with FA | 1.985 | 5.4 |
| 12 | B | aged with FA + DA | 1.823 | −3.2 |

The RSV values are the "relative solution viscosity," or the ratio of the viscosity of the solution of the polymer to the viscosity of the m-cresol solvent alone. The solutions of polymer had a polymer concentration of 0.5 mg/mL dissolved in m-cresol. The RSV was measured using a miniPV®-HX solution viscometer (Cannon Instrument Company, Pennsylvania). The RSV change shown in the table above represents the percent change in RSV after treatment compared to the fresh powder with no treatment (i.e., Sample 1 and Sample 7). Increases in RSV indicate that the powder became more crosslinked. The fact that the powders treated with triethylene glycol did not dissolve in the m-cresol indicate a high degree of crosslinking. The results suggest that treatment with small amounts of triethylene glycol, as in the detailing agent, result in a small increase in crosslinking. Treatment with pure triethylene glycol results in a larger increase in crosslinking.

Figure 6:
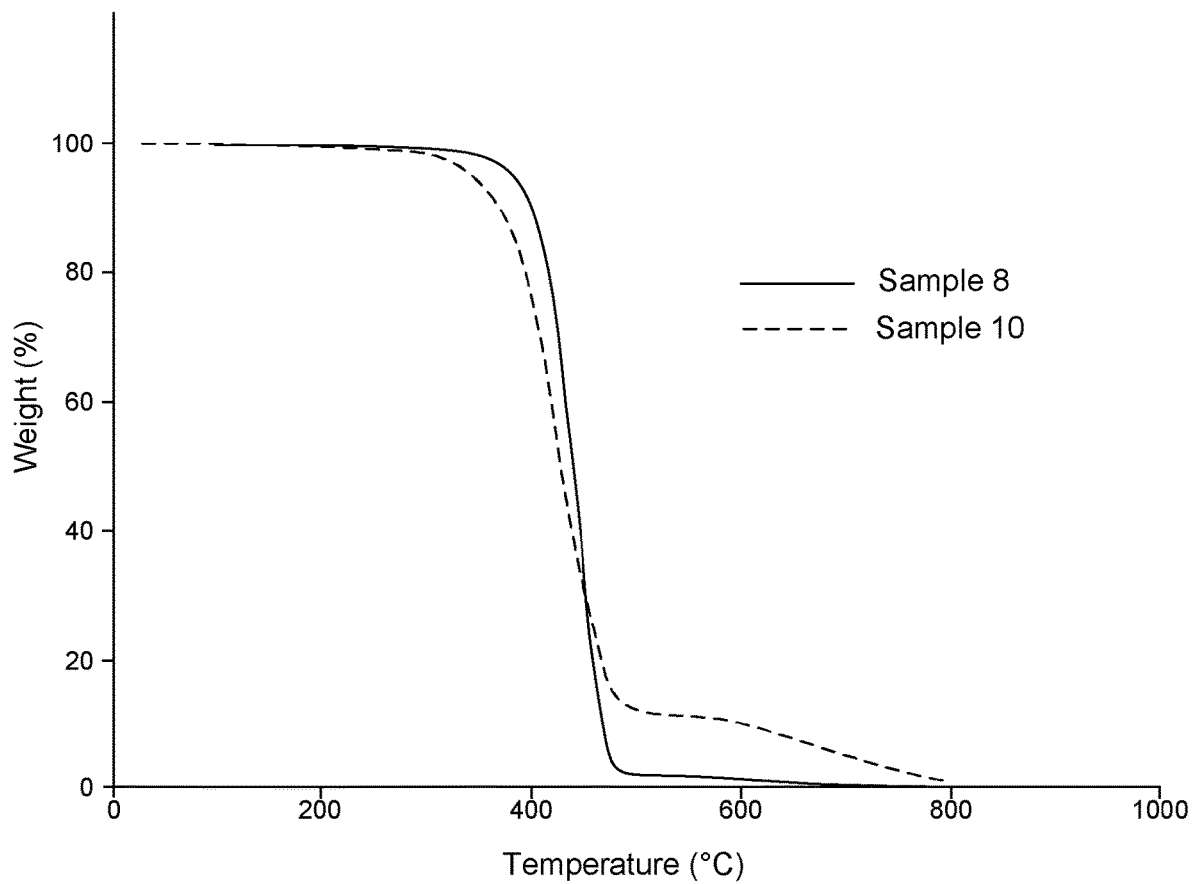
FIG. 6 is a graph of weight % vs. temperature from a thermogravimetric analysis of an example polymer material in accordance with examples of the present disclosure.

To further investigate the powder treated with triethylene glycol, the treated powder B (Sample 10) was analyzed using thermogravimetric analysis. The powder B that was aged without solvent (Sample 8) was also analyzed for comparison. FIG. 6 is a graph of wt % vs. temperature in ° C. from the thermogravimetric analysis of Sample 8 and Sample 10. As shown on the graph, Sample 8 decomposed almost completely at a temperature of about 475° C. However, Sample 10 had a significantly larger mass of the material remaining as the temperature increased up to 800° C. This indicates that the polymer of Sample 10 had more crosslinking and had a higher heat resistance.

A fusing agent was formulated including 20 wt % triethylene glycol. The fusing agent was then used in an HP Multi Jet Fusion 3D® test printer to produce a three-dimensional printed article. The fusing agent included the ingredients shown in Table 2.

TABLE 2

| Ingredient | Concentration (wt %) |
|---|---|
| Organic Co-solvent | 5-30 |
| Triethylene Glycol | 20 |
| Wetting Agent | 0.01-1 |
| Emulsifier | 0.01-1 |
| Chelating Agent | 0.01-1 |
| Biocide | 0.01-1 |
| Carbon Black Pigment | 1-10 |
| Deionized Water | balance |

A three-dimensional printed part was formed using the fusing agent and a polyamide 12 powder. The test printer included a carriage for carrying the fusing agent ejector, detailing agent ejector, and fusing lamps attached to either side of the carriage. The carriage passed over the individual layers of powder bed material from 1 to 4 times per layer. The fusing lamps can be turned on or off during any of the passes to control the amount of heating. The fusing agent and detailing agent can also be jetted during a single pass or multiple passes to help control the amount fusing agent and detailing agent applied to the various layer. The temperature of the powder bed was maintained at a constant 160° C. preheat temperature, and the fusing lamps were used to heat portions of the powder bed where the fusing agent is applied to a higher temperature to fuse the polymer particles.

After printing a three-dimensional printed article, the article was post-cured for 20 hours at 170° C. Two sample articles were printed and post-cured in this way. Two more sample articles were printed using the same fusing agent, but no post-curing was performed. Several mechanical properties of the sample articles were then measured. The mechanical properties are shown in Table 3.

TABLE 3

| Sample | Post-Cured? | Stress at Yield (MPa) | Tensile Strength (MPa) | Young's Modulus (MPa) | Strain at Yield (%) | Strain at Break (%) |
|---|---|---|---|---|---|---|
| 1 | yes | 64.237 | 64.237 | 2195 | 14.38 | 41.87 |
| 2 | yes | 53.162 | 53.162 | 2056 | 15.00 | 26.72 |
| 3 | no | 46.279 | 46.279 | 1584 | 16.41 | 391.68 |
| 4 | no | 45.554 | 45.554 | 1430 | 17.09 | 200.85 |

Samples 1 and 2 showed a significant increase in tensile strength and Young's modulus. This indicates that post-curing increases the amount of crosslinking in the three-dimensional printed part after printing with the triethylene glycol-containing fusing agent.

What is claimed is:

1. A method comprising:
    iteratively applying individual build material layers of polymer particles to a powder bed;
    based on a three-dimensional object model, selectively jetting a fusing agent onto the individual build material layers, wherein the fusing agent comprises water, a radiation absorber, and triethylene glycol in an amount from about 20 wt % to about 35 wt %, and wherein the radiation absorber absorbs radiation energy and converts the radiation energy to heat;
    exposing the powder bed to radiation energy to selectively fuse the polymer particles in contact with the radiation absorber at the individual build material layers and thereby form a three-dimensional printed article; and
    post-curing the three-dimensional printed article at a post-cure temperature from about 160° C. to about 250° C. for a post-cure time from about 2 hours to about 30 hours so as to increase crosslinking of the polymer with the triethylene glycol.

2. The method of claim 1, wherein the post-cure temperature is from about 170° C. to about 220° C.

3. The method of claim 2, wherein the post-cure time is from about 6 hours to about 24 hours.

4. The method of claim 1, wherein the post-cured article has a tensile strength from about 60 MPa to about 100 MPa and a Young's modulus from about 2,000 MPa to about 4,000 MPa.

5. The method of claim 1, wherein the concentration of triethylene glycol in the build material after jetting the fusing agent onto the individual build material layers is from about 2.5 wt % to about 4.5 wt % with respect to the weight of the build material.

6. The method of claim 1, wherein the radiation absorber is carbon black and the polymer particles include polyamide 12.

7. The method of claim 1, further comprising selectively jetting a detailing agent comprising a detailing compound onto the individual build material layers, wherein the detailing compound reduces the temperature of build material onto which the detailing agent is applied.

8. A system for three-dimensional printing comprising:
 a powder bed material comprising polymer particles;
 a fusing agent ejectable onto a layer of the powder bed material, wherein the fusing agent comprises water, a radiation absorber, and triethylene glycol in an amount from about 20 wt % to about 35 wt %, and wherein the radiation absorber absorbs radiation energy and converts the radiation energy to heat, the triethylene glycol being selected to crosslink the polymer;
 a radiant energy source positioned to expose the layer of powder bed material to radiation energy to selectively fuse the polymer particles in contact with the radiation absorber and thereby form a three-dimensional printed article; and
 a post-curing heater applying a post-cure temperature to the three-dimensional printed article from about 160° C. to about 250° C. for a post-cure time from about 2 hours to about 30 hours so as to increase crosslinking of the polymer with the triethylene glycol.

9. The system of claim 8, wherein the post-cure temperature is from about 170° C. to about 220° C. and the post-cure time is from about 6 hours to about 24 hours.

10. The system of claim 8, further comprising a detailing agent comprising a detailing compound that is ejectable onto the layer of powder bed material, wherein the detailing compound reduces the temperature of powder bed material onto which the detailing agent is applied.

\* \* \* \* \*